United States Patent
Neumann

(10) Patent No.: US 10,192,075 B2
(45) Date of Patent: Jan. 29, 2019

(54) METHOD OF SECRET INFORMATION ENTERING INTO ELECTRONIC DIGITAL DEVICES

(71) Applicant: ADUCID s.r.o., Brno (CZ)

(72) Inventor: Libor Neumann, Praha (CZ)

(73) Assignee: ADUCID S.R.O., Brno (CZ)

( * ) Notice: Subject to any disclaimer, the term of this patent is extended or adjusted under 35 U.S.C. 154(b) by 0 days.

(21) Appl. No.: 14/904,433

(22) PCT Filed: Jul. 11, 2014

(86) PCT No.: PCT/CZ2014/000080
§ 371 (c)(1),
(2) Date: Jan. 12, 2016

(87) PCT Pub. No.: WO2015/003672
PCT Pub. Date: Jan. 15, 2015

(65) Prior Publication Data
US 2016/0154980 A1 Jun. 2, 2016

(30) Foreign Application Priority Data
Jul. 12, 2013 (CZ) .............................. PV 2013-558

(51) Int. Cl.
*H04L 9/32* (2006.01)
*G06F 21/83* (2013.01)
*G06F 21/36* (2013.01)

(52) U.S. Cl.
CPC .............. *G06F 21/83* (2013.01); *G06F 21/36* (2013.01)

(58) Field of Classification Search
CPC ........ G06F 21/83; G06F 21/36; G06F 21/554; G06F 21/604; G06F 21/62;
(Continued)

(56) References Cited

U.S. PATENT DOCUMENTS

2002/0188872 A1  12/2002  Willeby
2005/0120213 A1  6/2005  Winget et al.
(Continued)

FOREIGN PATENT DOCUMENTS

| WO | 199618139 | 6/1996 |
| WO | 2002054199 | 7/2002 |
| WO | 2014187436 | 11/2014 |
| WO | 2015003672 | 1/2015 |

OTHER PUBLICATIONS

International Search Authority, Written Opinion of the International Searching Authority dated Sep. 15, 2014 issued on International Application No. PCT/CZ2014/000058 in the name of Anect A.S.
(Continued)

*Primary Examiner* — Abiy Getachew
(74) *Attorney, Agent, or Firm* — Franklin & Associates International Inc; Matthew Lambrinos

(57) ABSTRACT

The solution provides a method of secret information entering into an electronic digital device by a user via the input/output device, when the electronic digital device assigns a multimedia information designed for interaction containing the elements (1) is such a way that their relation to control elements of the electronic digital device is variable between individual displays. Then, the user selects elements (1) of multimedia information designed for interaction assigned to elements (2) of secret information in an order corresponding with the order of elements (2) of secret information, so by selecting the elements (1) of multimedia information designed for interaction the user selects the elements (2) of secret information in given order.

9 Claims, 1 Drawing Sheet

(58) Field of Classification Search
CPC . G06F 21/6209; G06F 21/88; G06K 9/00456; G06K 9/00469; H04N 1/00846; H04N 1/00859; H04N 1/00875; H04N 1/444; H04W 12/02; H04W 12/12; H04W 88/02
See application file for complete search history.

(56) References Cited

U.S. PATENT DOCUMENTS

| | | | |
|---|---|---|---|
| 2007/0136800 | A1 | 6/2007 | Chan et al. |
| 2007/0277224 | A1* | 11/2007 | Osborn .................. G06F 21/36 726/2 |
| 2009/0288143 | A1 | 11/2009 | Stebila et al. |
| 2010/0042838 | A1 | 2/2010 | Ho |
| 2013/0167225 | A1* | 6/2013 | Sanft ...................... G06F 21/36 726/19 |

OTHER PUBLICATIONS

The International Bureau of WIPO, International Preliminary Report on Patentability dated Nov. 24, 2015 issued on International Application No. PCT/CZ2014/000058 in the name of Anect A.S.
International Search Authority, International Search Report dated Sep. 15, 2014 issued on International Application No. PCT/CZ2014/000058 in the name of Anect A.S.
International Search Authority, Written Opinion of the International Searching Authority dated Sep. 19, 2014 issued on International Application No. PCT/CZ2014/000080 in the name of Anect A.S.
The International Bureau of WIPO, International Preliminary Report on Patentability dated Sep. 26, 2014 issued on International Application No. PCT/CZ2014/000080 in the name of Anect A.S.
International Search Authority, International Search Report dated Sep. 19, 2014 issued on International Application No. PCT/CZ2014/000080 in the name of Anect A.S.

* cited by examiner

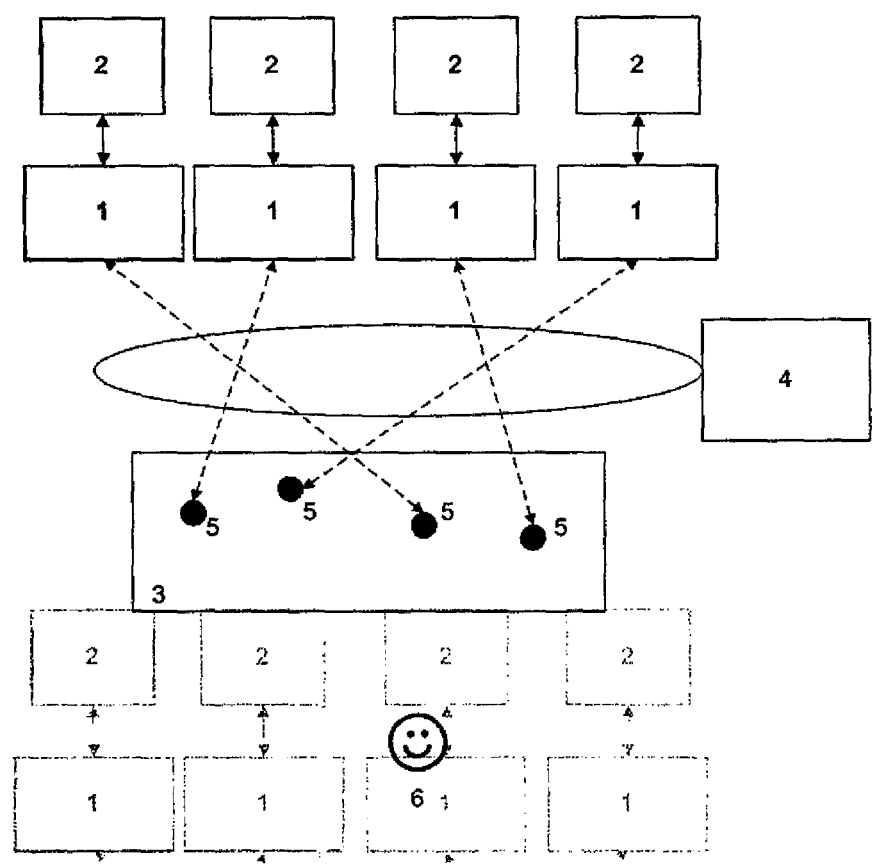

METHOD OF SECRET INFORMATION ENTERING INTO ELECTRONIC DIGITAL DEVICES

CROSS REFERENCE TO RELATED APPLICATIONS

This application is the National Stage of International Patent Application No. PCT/CZ2014/000080, filed Jul. 11, 2014, which claims priority under 35 U.S.C § 119 to CZ patent application PV 2013-558, filed Jul. 12, 2013.

TECHNICAL FIELD

The invention relates to the method of secret information entering into electronic digital devices through an ordinary input/output device.

BACKGROUND ART

Known methods of secret information entering use the same or similar methods of a secret information input as an ordinary non-sensitive information entering, i.e. direct connection of input device control elements with the information inserted.

In case of the input device being e.g. a keyboard, it is quite ordinary for the information relevant to the key to be entered when pressing the key for the purpose of entering secret information like e.g. password or PIN. Even other types of input devices operate on similar principle, like for example a virtual keyboard displayed on touch displays, a keyboard displayed in an application where a touch screen, a mouse or other position sensor is the input device.

The methods of secret information entry using directly the information on position or trajectory of some position input device, e.g. finger position on touch screen, operate on analogical basis.

The disadvantages of known methods of secret information entry include low entropy of the secret information entered and fixed connection of the secret information entered with the input device identically with the connection used for non-sensitive information entering. Consequently, it requires for the user to remember long and hard-to-remember secret sequences, like e.g. long passwords and it simultaneously increases chances for an attacker who may use e.g. camera recording of fingers movements when entering a secret information to reveal it.

SUBJECT OF THE INVENTION

The aim of the invention is to eliminate the above stated disadvantages, i.e. secret information entering into electronic devices in a new way, based on the fact that the secret information elements are indirectly connected with the input device and it is done in a completely different way compared to non-sensitive information entering. A set of information element pairs is used for the secret information entering. The connection of the pairs of elements with the input device is dynamic and it may differ for each individual use, while the connection of elements in the pair is constant. The pair always contains an element of multimedia information designed for interaction with the user and an element of secret information. Using a selection of the correct sequence of elements of multimedia information designed for interaction via the input device, the user sets the sequence of elements of secret information to create the secret information entered.

The method of secret information entry to an electronic digital device by a user using an input/output device according to this invention is based on the fact that the electronic digital device assigns to each element of secret information an element of multimedia information designed for interaction. Then, the electronic digital device displays to the user—while entering the information—multimedia information designed for interaction containing elements in such a way that their relation to control elements of the electronic digital device is variable between individual displays (e.g. the elements of multimedia information designed for interaction are displayed in randomly selected order while being displayed). Then, the user selects elements of multimedia information designed for interaction assigned to secret information elements in an order corresponding with the secret information elements order. That means that by selecting the multimedia information elements designed for interaction the user selects the secret information elements in given order.

The electronic digital device may be for example a computer, mobile phone, tablet, some other communication electronic digital device, etc.

The multimedia information designed for interaction is the multimedia information that is easy-to-remember for the user, who can easily recognize it and unambiguously select it from other multimedia information designed for interaction depending on his individual skills and technical equipment of the input device. The information may be entered to the electronic device during its manufacture, additionally during its setup or personification, it may be a piece of information obtained directly by the user. The element of multimedia information designed for interaction may be for example a letter, number, graphic symbol or any other typographic symbol, drawing, image, video sequence, sound sequence, vibration or some other movement, etc.

The term "displays", respectively "displaying" means such a form of information interpretation that corresponds with the given type of multimedia information medium and it mainly includes displaying of graphic and visual information, displaying (playing) of some sound information, displaying (playing) of a video sequence, mechanic transfer of sensorial information (vibration or some other movement) or corresponding interpretation of some other type of multimedia information suitable for interaction with users.

The secret information elements are usually information with high entropy, where every secret information element is closely linked with the appropriate element of multimedia information designed for interaction. It may be a piece of information completely different from the element of multimedia information designed for interaction, a piece of information derived from the element of multimedia information designed for interaction or a piece of information identical with the element of multimedia information designed for interaction. The secret information elements are not steadily built in during the device manufacture or software installation, but they are created during individual settings or personification of the device in such a way so as to contain high entropy of information.

Due to setting the correct sequence of elements of the information designed for interaction by the user there is also set the correct sequence of secret information elements. The user operates with multimedia information which is known to him and it is easy-to-remember and he sets it during individual settings usually by different control of the input device.

The invention presented provides protection against secret information breakthrough, like e.g. an access password, using e.g. camera recording monitoring the fingers movements when entering the secret information, as the layout of information elements is different for each entry. More, there are not directly entered the elements of secret information, but there are entered elements of information designed for interaction, so it is not possible to break through the password when accessing from another device, all of that even if the attackers know the combination of elements of information designed for interaction.

LIST OF FIGURES IN DRAWINGS

FIG. 1 displays the relation between information 1 designed for interaction, elements 2 of secret information, the input device 3, the control program 4 for secret information entering and control elements 5 of the input device 3.

EXAMPLE OF INVENTION REALISATION

Example 1

The method of entering secret information to electronic digital devices through an ordinary input device is based on use of digital images including digital photographs, used as Elements 1 of information designed for interaction. The elements 2 of secret information may be derived from images used based on their random modification or they may be independently generated and closely connected with Elements 1 of the information designed for interaction.

The input device 3 used by the User 6 for secret information entering is a touch display or a computer mouse in connection with a classic display. The control program 4 for secret information entry displays randomly organised Elements 1 of the information designed for interaction, i.e. digital images and/or digital photographs, The User 6 entering the secret information selects relevant Elements 1 of the information designed for interaction from given offer in appropriate order and enters them using the control elements 5 of the input device 3. Accordingly, the Control program 4 uses the Elements 2 of secret information in the same order and so it generates the relevant secret information.

In the course of the following entries, the Control program 4 for secret information entering displays Elements 1 of information designed for interaction (usually organised in a different way), i.e. for example the same photograph will be displayed in a different part of the display and the User 6 must be usually able to enter other positions using the input device 3 so as to enter the same order of Elements 1 of information designed for interaction and to determine in this way the same secret information consisting of Elements 2 of secret information.

Example 2

Another example of the invention realisation is the use of digital video sequences as Elements 1 of information designed for interaction. In such a case it is possible for a sole push button or key, i.e. a sole control element 5 to be used as the input device 3. The Control program 4 for secret information entering in a random order plays the individual Elements 1 of information designed for interaction and the User 6 uses the input device 3 to select the individual Elements 1 of information designed for interaction in the right order. On the basis of the above stated, he determines the secret information consisting of Elements 2 of secret information.

Example 3

Another example of the invention realisation is the use of sound recordings as Elements 1 of information designed for interaction. In such a case it is possible for a sole push button or key, i.e. a sole control element 5 to be used as the input device 3. The Control program 4 for secret information entering in a random order plays the individual Elements 1 of information designed for interaction and the User 6 uses the input device 3 to select the individual Elements 1 of information designed for interaction in the right order. On the basis of the above stated, he determines the secret information consisting of Elements 2 of secret information.

Example 4

Another example of the invention realisation is the use of digits as Elements 1 of information designed for interaction. The elements 2 of secret information may be derived from the digits used in such a way that they may be generated by derivation from the digits or these may be digits identical with the digits creating the Elements 1 of information designed for interaction. The elements 1 of information designed for interaction are closely linked with elements 2 of secret information.

The input device 3 used by the User 6 for secret information entering is a touch display. The Control program 4 for secret information entering displays an ordinary numeric pad but with randomly organised Elements 1 of information designed for interaction, i.e. with digits in random order. On such a displayed numeric pad, the User 6 entering the secret information selects the appropriate digits, i.e. Elements 1 of information designed for interaction in appropriate order and enters them using the control elements 5 of the input device 3. Accordingly, the Control program 4 uses the Elements 2 of secret information in the same order and so it generates the relevant secret information.

In the course of the following entries, the Control program 4 for secret information entering displays a numeric pad with Elements 1 of information designed for interaction (usually organised in a different way), i.e. the digits will be displayed on numeric pad in a different location of display and the User 6 must be usually able to set other positions using the input device 3 so as to enter the same order of Elements 1 of information designed for interaction and to determine in this way the same secret information consisting of Elements 2 of secret information.

The invention claimed is:

1. A method of a secret information entering to an electronic digital device by a user using an input/output device, said method comprising the steps of:
assigning, by the electronic digital device, to each of elements (2) of the secret information an element (1) of multimedia information designed for interaction during indirect entering of the secret information, the electronic digital device displays to the user the multimedia information designed for interaction containing elements (1) in such a way that their relation to control elements (5) of the electronic digital device is variable between individual displays; and
selecting, by the user, the elements (1) of the multimedia information designed for interaction assigned to the elements (2) of the secret information in an order corresponding with the order of the elements (2) of the secret information, so by selecting the elements (1) of the multimedia information designed for interaction the user selects the elements (2) of the secret information in given order.

2. The method according to claim 1, characterized by that the elements (2) of the secret information are identical with the entered elements (1) of the multimedia information designed for interaction or they are derived from entered elements (1) of the multimedia information designed for interaction.

3. The method according to claim 1, characterized by that the elements (2) of the secret information are different from the elements (1) of the multimedia information designed for interaction.

4. The method according to claim 1, wherein the elements (2) of the secret information are derived from the group consisting of images based on random modification, images based on independently generated and connected with the elements (1) of the multimedia information designed for interaction, second digits generated by derivation from first digits, and digits identical with digits creating the elements (1) of the multimedia information designed for interaction.

5. The method according to claim 1, wherein the elements (1) are displayed to the user as a numeric pad with the elements (1) randomly located.

6. A non-transitory computer readable media with an executable control program stored thereon comprising instructions for execution by at least one processor, such that the instructions when executed by the processor cause the processor to:
 assign, by an electronic digital device, an element (1) of multimedia information designed for interaction to each of elements (2) of a secret information;
 display, by the electronic digital device and during indirect entering of the secret information, to a user the multimedia information designed for interaction containing elements (1) in such a way that their relation to control elements (5) of the electronic digital device is variable between individual displays; and
 receive, by the electronic digital device, a selection of the elements (1) of the multimedia information designed for interaction assigned to the elements (2) of the secret information in an order corresponding with the order of the elements (2) of the secret information, so by selecting the elements (1) of the multimedia information designed for interaction the user selects the elements (2) of the secret information in given order.

7. The non-transitory computer readable media according to claim 6, where the elements (2) of the secret information are identical with the entered elements (1) of the multimedia information designed for interaction or they are derived from entered elements (1) of the multimedia information designed for interaction.

8. The non-transitory computer readable media according to claim 6, wherein the elements (2) of the secret information are different from the elements (1) of the multimedia information designed for interaction.

9. An electronic digital device with a control program associated therewith, said electronic digital device comprising:
 an input device;
 a display device;
 a memory coupled to a processor, said memory storing instructions that, when executed by the processor, causes the processor to:
 assign an element (1) of multimedia information designed for interaction to each of elements (2) of a secret information;
 display by the display device and during indirect entering of the secret information, to a user the multimedia information designed for interaction containing the elements (1) in such a way that their relation to control elements (5) of the electronic digital device is variable between individual display devices; and
 receive by the input device a selection of the elements (1) of the multimedia information designed for interaction assigned to the elements (2) of the secret information in an order corresponding with the order of the elements (2) of the secret information, so by selecting the elements (1) of the multimedia information designed for interaction the user selects the elements (2) of the secret information in given order.

* * * * *